Figure 1:
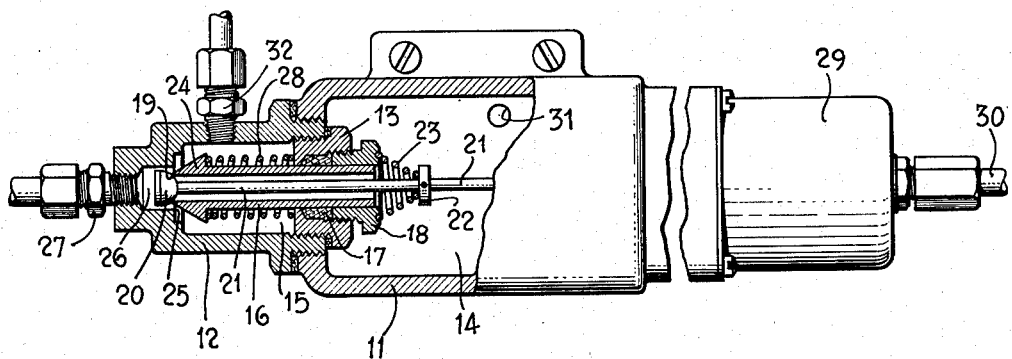

April 23, 1946.   W. A. RAY   2,398,855

FLUID CONTROL VALVE

Original Filed Jan. 27, 1941

Inventor:
WILLIAM A. RAY,
By John H. Rouse,
Attorney.

Patented Apr. 23, 1946

2,398,855

UNITED STATES PATENT OFFICE 2,398,855

FLUID CONTROL VALVE

William A. Ray, Los Angeles, Calif., assignor to General Controls Co., a corporation Original application January 27, 1941, Serial No. 376,137, now Patent No. 2,317,640, dated April 27, 1943. Divided and this application April 19, 1943, Serial No. 483,543

1 Claim. (Cl. 277—21)

This invention relates to fluid control valves; the present application being a division of my copending application, Serial No. 376,137, filed January 27, 1941, now Patent 2,317,640, granted April 27, 1943.

An object of the invention is to provide a valve structure wherein a valve seat member is movable, and is maintained in engagement with its closure during a portion of the travel of the same; continued movement of the closure effecting its disengagement from the seat.

Another object is to provide a "floating" three-way valve embodying the feature set forth in the preceding object, whereby one of the valve ports is closed before the other is opened.

Another object is to provide a three-way valve, of the character described, wherein normal wear does not bring about the possibility of both of the valve ports being open simultaneously.

Figure 2:
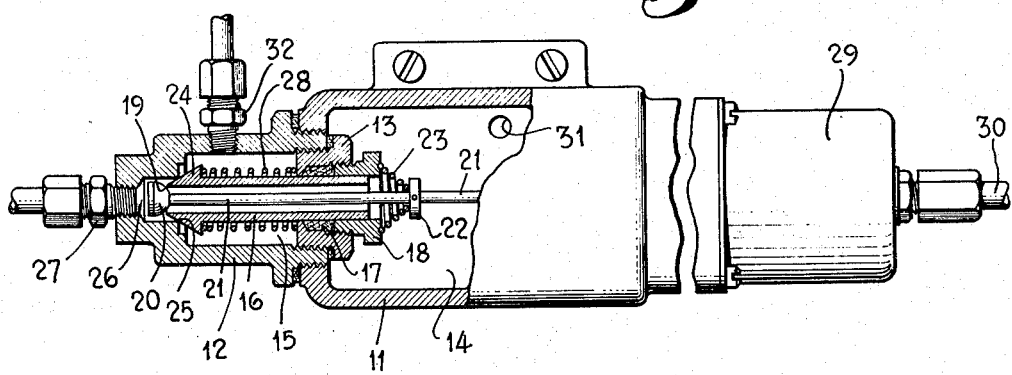

Other objects and advantages of the invention will be found in the description, the drawing, and the claim; and, for full understanding of the invention, reference may be had to the following detailed description and accompanying drawing, wherein:

Figure 1 is a view, mainly in longitudinal section, of a structure embodying my invention; and Figure 2 is a similar view showing the parts in a moved position.

In the drawing, the numeral 11 indicates a valve casing having an opening through its left-hand end wall wherein is threaded a hollow member or sub-casing 12; the end of the sub-casing joining the casing 11 being threaded to receive a bushing 13 which forms part of a partition separating the interiors, or chambers, 14 and 15 of the casing and sub-casing, respectively. Slidable in the bushing 13 is an elongated tubular member 16; and to prevent leakage around this member, the bushing is recessed to receive packing 17 and a gland nut 18.

The tubular member 16 provides, at the left-hand end of its bore, a seat 19 for a closure 20 having a stem 21 which extends through the member into chamber 14, and is there provided with a collar 22 which forms an abutment for a spring 23 compressed between it and the gland nut 18. The end of member 16 within chamber 15 is provided with a tapered head 24 which co-operates with a seat 25 formed at the inner end of an opening 26 through the end wall of the sub-casing; in the outer end of which opening is threaded a hollow fitting 27. Encircling the portion of member 16 within chamber 15 is a spring 28, compressed between the head 24 and bushing 13, which serves normally to maintain the seat 19 of member 16 in engagement with closure 20; the spring 28 being considerably weaker than spring 23 so that the member 16 is moved only in accordance with the movement of stem 21.

Sealingly extending through the right-hand end wall of casing 11 is means for imparting longitudinal movement to stem 21 in accordance with variation of fluid pressure applied to a motor 29 through a pipe 30; the construction of these parts not being shown, since they form no essential part of the present invention. Through the rear wall of casing 11 is an opening 31, and in the top wall of the sub-casing is an opening for a hollow fitting 32.

When the parts are in the positions shown in Fig. 1, fluid can pass between the fittings 27 and 32 around the open valve seat 25; no fluid being able to pass through the tubular member 16 inasmuch as the seat 19 of that member is maintained in engagement with the closure 20 by the force of spring 28. Gradual movement of stem 21 in a left-hand direction permits corresponding movement of the member 16 (under the force of spring 28) until farther movement of the member is arrested by the engagement of its head 24 with the seat 25. At this instant, passage of fluid between fittings 27 and 32—as well as through member 16—is obstructed. Continued movement of stem 21 in a left-hand direction effects disengagement of closure 20 from its seat 19 (the parts being in the positions shown in Fig. 2) so that fluid can then then pass—through the space between stem 21 and member 16—between fitting 27 and the opening 31 of chamber 14; communication between fittings 27 and 32 now being obstructed by the seated head 24 of member 16. Subsequent movement of the stem 21 in an opposite direction effects, first, seating of closure 20, and then unseating of the head 24. Since the member 16 is moved only through the agency of the closure 20 of stem 21, it is clear that one of the described fluid paths must be closed before the other is opened, regardless of normal wear of the parts.

The three-way valve hereinabove described obviously has varied uses; as an example, if the fitting 27 is connected to a fluid pressure motor (such as one which includes a spring-biased diaphragm), the opening 31 to a source of compressed air, and the fitting 32 to atmosphere—when the valve parts are in the positions shown in Fig. 1, the motor is vented to atmosphere;

and when the valve parts are in the positions shown in Fig. 2, compressed air is supplied to the motor. In no condition of the valves could the compressed air pass directly from the source to the atmosphere.

While I have herein shown and described a specific embodiment of my invention, I wish it to be understood that modifications may be made without departing from the spirit of the invention, and that I intend therefore to be limited only by the scope of the appended claim.

I claim as my invention:

A valve structure adapted for mounting in an opening through a wall of means defining a chamber for fluid under pressure, said structure comprising an elongated tubular casing having aligned openings through its opposite ends, said casing being externally threaded at one of said ends for attachment in said wall opening, a guide bushing threaded in the opening at said one of the casing ends, an elongated tubular member sealingly reciprocable in said guide bushing, the end of said member within said casing being enlarged, means at the other of the casing ends forming a valve seat cooperable with said enlarged end of the member, a closure cooperable with the inner portion of said end of the member and having a stem freely extending through the member into said chamber, a spring encircling the portion of the member within said casing and compressed between said bushing and said enlarged end of the member, said spring urging the member in a direction toward its seat so that when said closure is moved in the same direction the member moves therewith, and means at the end of the stem opposite to said closure for moving the closure, there being an opening through a side wall of said casing adjacent said valve seat.

WILLIAM A. RAY.